United States Patent Office 3,196,123
Patented July 20, 1965

3,196,123
POLYMER SURFACES ENHANCED FOR PRINTING BY ADDITION OF EPOXIDIZED POLYMER
Charles E. Wheelock, Minneapolis, Minn., assignor to Phillips Petroleum Company, a corporation of Delaware
No Drawing. Filed Jan. 5, 1962, Ser. No. 164,617
7 Claims. (Cl. 260—30.4)

This application is a continuation-in-part of my co-pending application having Serial No. 681,479, filed September 3, 1957, now abandoned.

This invention relates to a novel polymer composition having a surface strongly receptive to inks and coating compositions. In one aspect, it relates to a method for improving the bonding properties of polymers of aliphatic hydrocarbons. In another aspect, it relates to a method for printing on the surfaces of polymers of aliphatic hydrocarbons.

Various methods are described in the literature for producing normally solid and semisolid polymers. For example, hydrocarbons such as ethylene, propylene, isobutene, butadiene and styrene, can be polymerized, either independently or in various admixtures with one another, to produce solid or semisolid polymers. Recently, considerable attention has been directed to the production of solid polymers of ethylene and/or propylene. The polymerizations are frequently carried out in the presence of solid catalyst, utilizing a liquid solvent as the reaction medium. These novel solid polymers have many applications and are especially useful in the fabrication of molded and extruded articles, such as food containers, bottles, film, rods, pipe, and the like. Many of the articles produced require that various printed matter, such as identifying names, trademarks, trade names, instructions, and the like, be printed, stamped, or otherwise applied to the polymer surface. Several methods have been proposed for accomplishing such printing, e.g., by the use of a special ink or by special treatment of the polymer surfaces to increase their affinity for an ink. However, such methods have not proven to be entirely satisfactory, generally, either because of an adverse effect on the polymer properties or poor ink adhesion. In accordance with this invention, there is provided a polymer composition having a surface which is very receptive to inks and coating compositions.

It is an object of this invention to provide a novel polymer composition having a surface which has a strong affinity for inks and coating compositions.

Another object of the invention is to provide a method of printing on the surface of a hydrocarbon polymer, which does not have an adverse effect on the polymer properties.

Other and further objects and advantages of the invention will become apparent to those skilled in the art upon consideration of the accompanying disclosure.

The instant invention resides in a novel composition of matter comprising a polymer of an aliphatic hydrocarbon, particularly a polymer of an aliphatic 1-olefin, and an epoxidized polymer of a conjugated diene. The expression "polymer of a conjugated diene" as used herein is intended to include homopolymers of conjugated dienes as well as copolymers of conjugated dienes in admixture with each other and/or with lesser amounts of one or more compounds containing an active $CH_2=C<$ which are copolymerizable therewith. It has been discovered that such a polymer composition has a polymer surface which is very receptive to printing inks. The reason the polymer composition provides a surface to which printing inks are so strongly adherent is not completely understood. However, it is believed that addition of the epoxidized polymer to the solid polymer results in a polymer composition having a surface to which materials in the ink are chemically bonded.

The instant invention is particularly applicable to solid polymers of aliphatic hydrocarbons, especially polymers of ethylene and/or propylene. The invention is broadly applicable to solid polymers selected from homopolymers of aliphatic 1-olefins having up to and including 8 carbon atoms per molecule, such as ethylene, propylene, butene-1, pentene-1, 4-methylpentene-1, hexene-1, heptene-1, octene-1, and the like, and copolymers of two or more of said 1-olefins, such as copolymers of ethylene and propylene, ethylene and butene-1, ethylene and hexene-1, propylene and ocetene-1, ethylene and 4-methylpentene-1, ethylene and octene-1, hexene-1 and octene-1, and the like. The term "polymer of ethylene," for example, as used herein, is intended to include polymers obtained by polymerizing ethylene alone and by polymerizing mixtures of ethylene and minor amounts of other monoolefins containing from 3 to 8 carbon atoms per molecule. Particular polymers which can be improved with respect to ink printing properties according to the invention include polyethylene, polypropylene, ethylene-propylene copolymers, ethylene-butene-1 copolymers, propylene-butene-1 copolymers, ethylene-hexene-1 copolymers, and the like. Conventional polyethylenes, such as low density polyethylenes produced by high pressure processes, can be used in preparing the novel composition of this invention. High density solid homopolymers and copolymers of 1-olefins produced in accordance with the process described in the copending U.S. patent application of Hogan and Banks, Serial No. 476,306, filed December 20, 1954, now abandoned, filed March 26, 1956, as continuation-in-part application Serial No. 573,877, now U.S. 2,825,721, can also be advantageously utilized, and are generally preferred because of their outstanding properties. These latter polymers often have an inherent viscosity of at least 0.8, preferably an inherent viscosity between 1.2 and about 10, as determined for a solution of 0.2 gram of polymer in 50 cc. of tetralin at 130° C. Certain of these polymers also have a density of at least 0.94, preferably at least 0.95, at 25° C. and a crystallinity of at least 70 percent, preferably at least 80 percent, and more desirably at least 90 percent, at 25° C. The crystallinity of the polymers can be determined by measurements of nuclear magnetic resonance [Wilson and Pake, Journal of Polymer Science, 10, 503 (1953)], using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall of about 1.5° C. per minute at 135° C. The crystallinity can also be determined according to the method of Matthews, Peiser and Richards, Acta Crystallographica 2, 85 (1949). The softening point of the polymer will vary with the particular polymer used increasing as the density and the crystallinity of the polymer increases. Generally, the softening point of the high density solid polymer is above about 250° F., preferably in the approximate range of 250 to 300° F., and is several degrees higher, e.g., about 10° F., than the melting point of the polymer.

The polymers used in preparing the expoxidized polymers of this invention are preferably liquid materials and include polymers prepared by the polymerization of conjugated dienes containing from 4 to 8 carbon atoms, such as isoprene, 2-methyl-1,3-butadiene, piperylene (1,3-pentadiene), 2,3-dimethyl-1,3-butadiene, 1,3-hexadiene, 2,4-hexadiene, 2-4-heptadiene, and 2,4-dimethyl-1,3-hexadiene, and copolymers prepared by the copolymerization of the aforementioned conjugated dienes in admixture with each other and/or with lesser amounts of one or more of the compounds containing an active $CH_2=C<$ group which are copolymerizable therewith. Examples of these latter compounds include styrene, acrylonitrile, methacrylonitrile, methylacrylate, methyl methacrylate, vinyl acetate, vinyl chloride, 2-methyl-5-vinylpyridine, 2-vinylpyridine, 4-vinylpyridine, and the like. It is preferred to employ expoxidized liquid polybutadiene in the novel composition of this invention. However, it is to be understood that epoxidized liquid and solid polymers of conjugated dienes are, in general, applicable to the instant invention.

The polymeric starting materials used in preparing the epoxidized polymers can be prepared by a mass polymerization process conducted, for example, in such a manner that a liquid polymer is produced by the sodium catalyzed polymerization of 1,3-butadiene, isoprene, or copolymerization of butadiene and styrene, or by emulsion polymerization processes which are well known in the art. Furthermore, the epoxidation of the polymeric starting materials can be accomplished by methods described in the literature. Accordingly, it is not intended to limit the invention to any particular method of obtaining the polymeric materials to be epoxidized or to any particular epoxidation method. However, it has been found that the method for epoxidizing polymers described in the copending U.S. patent application of P. J. Canterino and C. E. Wheelock, Serial No. 612,890, filed September 28, 1956, now U.S. Patent 3,022,322, can be advantageously employed. As set forth in this application in detail, epoxidized polymer, particularly epoxidized polybutadiene, is prepared by reacting a liquid polymer with an organic peracid. In a preferred embodiment, the organic peracid is formed in situ by using an ion exchange resin to catalyze the formation of the peracid. More specifically, a nuclear sulfonic cation exchange resin, such as Amberlite resin IR-120, Permutit Q, Nalcite HCR, and Dowex 50X, is employed to catalyze the reaction between an organic acid and hydrogen peroxide. The epoxidized polymers contain from about 0.6 to 19 weight percent oxirane oxygen. In the practice of the instant invention, it is preferred to use epoxidized polymers which have at least 1.4 percent oxirane oxygen. Some of the epoxidized polymers are liquid in the temperature range of zero to 100° C., having a viscosity in this temperature range of about 1 to 500,000 centipoises. Certain of the epoxidized polymers are solids, and these solid materials are equally useful in forming the novel compositions of this invention.

The amount of epoxidized polymer necessary to be added to the solid polymer in order to provide a polymer composition having a surface strongly adherent to printing ink is usually very small. The epoxidized polymers are generally admixed with the polymer in amounts ranging from 0.03 to 3, preferably from 0.05 to .20, weight percent, based on the amount of polymer. However, it has been found that a definite improvement in printability can be obtained when using amounts as low as 0.01 weight percent. The optimum concentration to use in order to provide a polymer composition having a surface to which a particular ink is strongly adherent can be readily determined by routine tests.

In preparing the composition of this invention, the epoxidized polymers are generally incorporated into the solid polymer at a temperature sufficiently high to soften the polymer and thereby facilitate blending. This is usually accomplished at a temperature above the softening point of the polymer but not above the temperature at which degradation of either of the components takes place. Blending of the epoxidized polymer with the solid polymer can be accomplished by any suitable means, such as on a roll mill, in a Banbury mixer, by heating and mixing in a vessel provided with a suitable means for agitation, or the like, the blending or mixing of the material being continued until a homogeneous composition is obtained. It is also within the scope of the invention to add the epoxidized polymer to the solid polymer during the molding or extrusion operations performed in fabricating various articles. When the blending is to be accomplished by a milling operation, pelletized or powdered polymer can be advantageously mixed with the epoxidized polymer prior to milling in order to decrease the actual milling time required.

While the present invention is not limited to any specific ink, it is usually preferred to use a printing ink which employs a vehicle containing a drying oil. Examples of drying oils, usually of vegetable origin, which can be used, include linseed oil (lithographic "litho" varnishes), tung oil, soybean oil, and the like. Of the various drying oils, it is generally preferred to employ litho varnishes which are heat-bodied linseed oils, whose viscosity has been increased by heat processing the raw oil. The vehicle in addition to the drying oil usually contains several other ingredients. For example, oleoresinous types of vehicles, commonly known as varnishes, in addition to drying oils contain such materials as resins and driers. The resinous constitutents of the vehicle, which provide among others the properties of hardness and resistance to wear, include such materials as coumarone-indene resins, petroleum resins, alkyd resins, phenolic resins, and the like. Examples of driers which can be used are the naphthenate salts of lead, cobalt and manganese. Various pigments are usually contained in the ink in order to give it a desired color. Examples of inorganic pigments include titanium dioxide, zinc oxide, white lead, iron blues, Milori blue, chrome yellows, cadmium yellows and reds, molybdate orange, carbon black, and the like. Organic pigments, such as the azo colors, lithol reds, and the triphenylmethane derivatives, can also be employed. The several components of the printing ink composition are combined in various proportions depending upon the specific properties, e.g., viscosity or color, to be imparted to the ink. Selection of the correct proportions of ingredients to provide an ink having desired characteristics can be readily accomplished by one skilled in the art.

The novel compositions of the invention have many applications and are especially useful in the fabrication of molded and extruded articles, such as food containers, bottles, film, rods, pipe, and the like, especially for the fabrication of articles that requrie various printed matter, such as identifying names, trademarks, trade names, instructions, and the like, be printed, stamped, or otherwise applied to the polymer surface.

A more comprehensive understanding of the invention can be obtained by referring to the following illustrative example which is not intended, however, to be unduly limitative of the invention.

EXAMPLE

Epoxidized liquid polybutadiene was prepared in accordance with the following procedure. Liquid polybutadiene having a viscosity of about 400 Saybolt Furol Seconds at 100° F. was stripped in a batch operation by flushing for 45 minutes with nitrogen at a temperature between 380 and 400° F. and a pressure between 10 and 20 mm. Hg absolute. About 432 grams of the liquid polybutadiene was dissolved in 2 liters of chloroform contained in a flask positioned in a bath. At this point, 280 grams of an ion exchange resin (Amberlite resin IR-120), which had been converted to the acid form and treated with glacial acetic acid, was added to the flask. When the mixture was at about 43° C., 266 grams 50 percent hydrogen peroxide was slowly added to the flask over a period of between 30 and 40 minutes. The ion exchange resin was removed by filtration, and the filtrate was washed with water and dilute sodium bicarbonate solution until the organic phase tested neutral to litmus. The organic phase was then dried over anhydrous sodium sulfate, and the solvent was stripped off by warming under vacuum. The remaining organic portion was epoxidized liquid polybutadiene which had a total oxygen content of 10.3 weight percent of which 6.7 weight percent was oxirane oxygen. Epoxy oxygen content was determined by the hydrochloric acid-dioxane method described in Organic Analysis, Mitchell et al., volume 1, pages 135–136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

Polyethylene pellets (DYNH) (a product of Bakelite Company) were weighed into polyethylene sacks so as to give a total weight of 75 grams of polyethylene. Samples of the above-described epoxidized liquid polybutadiene were added to the sacks in amounts such that mixtures containing 0.13, 0.66, and 1.3 weight percent of the epoxidized polymer were obtained. The mixtures of polyethylene pellets and epoxidized liquid polybutadiene were milled for 10 minutes on a roll mill. The mills had rolls which were three inches in diameter and six inches long and the temperature of the rolls was maintained at 240° F. The sheets obtained from the milling operation were subsequently molded into plates which are approximately six inches square. Each of the plates was marked off in sections, and each section was imprinted with letters using a rubber stamp which was inked with one of the specimen inks shown in Table I.

*Table I.—Identification of inks*

| No. | Designation | Color | Manufacturer |
| --- | --- | --- | --- |
| 1 | MLS; S-271 | Orange | Multigraph Sales Agencies, Cleveland, Ohio. |
| 2 | Van Son 42577 | Blue-green | Van Son Holland Ink Corp., Hilversum, Holland. |
| 3 | Colitho No. 28 | Green | Columbia Ribbon & Carbon Co., Glen Cove, New York. |
| 4 | Colitho No. 5 | Purple | Do. |
| 5 | No. 212-930 | Blue | Sinclair & Valentine Co., 307 West 8th Street, Kansas City, Missouri. |

Ink No. 1 contained linseed oil, varnish, pigments, toners and driers.

Ink No. 3 contained primrose yellow, aluminum hydrate, titanium dioxide, iron blue, and molybdated green toner, which constituted the pigment portion, a drier, and litho varnish. The vehicle portion of this ink had a very low organic acid number.

Ink No. 4 contained aluminum hydrate, iron blue, and alkali blue toner, which was the pigment portion, a drier, litho varnish and oleoresinous varnish. The vehicle portion of this ink also had a very low organic acid number.

The ink on the plates was then allowed to dry after which the plates were subjected to a scrubbing test to measure the wearability of the printed letters. The scrubbing test was carried out with a Gardner Straight Line Washability Machine manufactured by the Gardner Laboratories, Bethesda, Maryland. In this test, a bristle brush was caused to sweep back and forth over the inked plate while the plate was wet with a soap solution. The number of strokes required to remove all of the imprint was recorded. These values, which are herein defined as the relative resistance to scrubbing, are recorded below in Table II.

*Table II.—The effect of expoxidized liquid polybutadiene upon the durability of imprints on polyethylene*

| Ink No. | Relative Resistance to Scrubbing | | | | |
| --- | --- | --- | --- | --- | --- |
| | 1 | 2 | 3 | 4 | 5 |
| Wt. Percent Epoxidized Polymer: | | | | | |
| 0 | 74 | 495 | 175 | 188 | 96 |
| 0.13 | 328 | >1,000 | 567 | >1,000 | 335 |
| 0.66 | 327 | 194 | 408 | 290 | 223 |
| 1.3 | 100 | 147 | 364 | 241 | 370 |

The data in Table II show that concentrations of epoxidized liquid polybutadiene as low as 0.13 weight percent have a significant effect in providing a polymer surface to which ink is strongly adherent. It is also seen that higher concentrations, e.g., 1.3 weight percent, although not as effective as the lower concentrations, resulted in a polymer composition having a surface which was more receptive to ink than the surface of the polymer to which the epoxidized polymer had not been added.

From the foregoing, it is seen that the instant invention provides a method for improving the bonding properties of hydrocarbon polymers which comprises adding an epoxidized polymer to the hydrocarbon polymer. It will be apparent to those skilled in the art that variations and modifications of the invention can be made in the light of the foregoing disclosure. Such variations and modifications are believed to be clearly within the spirit and scope of the invention.

I claim:

1. A composition of matter comprising a solid polymer selected from the group consisting of homopolymers of aliphatic 1-olefins having from 2 to 8, inclusive, carbon atoms per molecule and copolymers of at least two of said 1-olefins and, in an amount sufficient to improve the printability of said solid polymer, an epoxidized polymer selected from the group consisting of (1) an epoxidized homopolymer of a conjugated diene containing from 4 to 8, inclusive, carbon atoms and (2) an epoxidized copolymer of a conjugated diene containing from 4 to 8, inclusive, carbon atoms and a lesser amount of an ethylenically unsaturated compound copolymerizable therewith containing an active $CH_2=C<$ group, said epoxidized polymer containing from about 0.6 to 19 weight percent oxirane oxygen.

2. The composition according to claim 1 wherein said solid polymer is a polymer of ethylene and said epoxidized polymer is epoxidized liquid polybutadiene.

3. The composition according to claim 1 wherein said solid polymer is a polymer of ethylene and said epoxidized polymer is expoxidized liquid polyisoprene.

4. The composition according to claim 1 wherein said solid polymer is a polymer of ethylene and said epoxidized polymer is an epoxidized liquid copolymer of butadiene and styrene.

5. The composition according to claim 1 wherein said solid polymer is a polymer of ethylene and said epoxidized polymer is an epoxidized liquid copolymer of butadiene and 2-methyl-5-vinylpyridine.

6. A composition of matter comprising a solid polymer of ethylene and between 0.03 and 3 weight percent, based on the amount of said polymer, of an epoxidized polymer selected from the group consisting of (1) an epoxidized homopolymer of a conjugated diene containing from 4 to 8, inclusive, carbon atoms and (2) an epoxidized copolymer of a conjugated diene containing from 4 to 8, inclusive, carbon atoms and a lesser amount of an ethylenically unsaturated compound copolymerizable therewith containing an active $CH_2=C<$ group, said epoxidized polymer containing from about 0.6 to 19 weight percent oxirane oxygen.

7. A composition of matter consisting essentially of a polymer of ethylene and between 0.03 and 3 weight percent of epoxidized liquid polybutadiene containing from about 0.6 to 19 weight percent oxirane oxygen.

References Cited by the Examiner

UNITED STATES PATENTS 3,022,322  2/62  Wheelock et al. _____ 260—348.5

MORRIS LIEBMAN, *Primary Examiner.*